(12) United States Patent
Mell

(10) Patent No.: US 7,845,107 B1
(45) Date of Patent: Dec. 7, 2010

(54) ARTIFICIAL INTERCHANGEABLE HYBRID LURE WITH PERFORATIONS

(76) Inventor: Troy B. Mell, P.O. Box 678, Islamorada, FL (US) 33036

( * ) Notice: Subject to any disclaimer, the term of this patent is extended or adjusted under 35 U.S.C. 154(b) by 493 days.

(21) Appl. No.: 11/674,778

(22) Filed: Feb. 14, 2007

Related U.S. Application Data

(63) Continuation-in-part of application No. 11/308,379, filed on Mar. 20, 2006, now abandoned.

(51) Int. Cl.
*A01K 85/00* (2006.01)

(52) U.S. Cl. .......................... 43/42.24; 43/42; 43/42.28

(58) Field of Classification Search ............... 43/42, 43/42.24, 42.26, 42.28, 42.29, 42.3, 42.27, 43/42.1; D22/132, 133, 128
See application file for complete search history.

(56) References Cited

U.S. PATENT DOCUMENTS

| | | | |
|---|---|---|---|
| 3,389,490 A | | 6/1968 | Peters et al. |
| D233,988 S | * | 12/1974 | Best ........................ D22/127 |
| 3,971,152 A | * | 7/1976 | Husson, Jr. ............... 43/42.06 |
| 4,074,454 A | * | 2/1978 | Cordell, Jr. ............... 43/42.28 |
| 4,516,352 A | | 5/1985 | Firmin |
| 4,790,100 A | * | 12/1988 | Green, Sr. ................. 43/42.26 |
| 4,862,630 A | | 9/1989 | Welch |
| 5,934,008 A | | 8/1999 | Rice |
| 6,226,918 B1 | * | 5/2001 | Rigney ..................... 43/42.24 |
| 7,076,911 B2 | * | 7/2006 | Thorne ..................... 43/42.26 |

OTHER PUBLICATIONS

Yo-Zuri, http://web.archive.org/web/20050306093903/http://www.eangler.com/webapp/wcs/stores/servlet/ProductDisplay?storeId=10701 &catalogId=10051&langId=-1 &productId=749699; Mar. 6, 2005.* eANGLER, Yo-Zuri Soft Squid Lure, On-Line Website, Jul. 19, 2006, www.eangler.com, US.

* cited by examiner

*Primary Examiner*—Joshua J Michener
(74) *Attorney, Agent, or Firm*—Malin Haley Dimaggio Bowen & Lhota, P.A.

(57) ABSTRACT

An artificial fishing lure having two separate uses resembling both a squid or a baitfish dependent upon the hook set direction. The lure has a cylindrical body member and elongated flexible tentacles. The lure may be operated in a forward direction to resemble a baitfish and a backward direction to resemble a squid. The lure body has perforations so that the bait fish tail area can be manually torn from the lure body for use as a squid looking bait.

9 Claims, 3 Drawing Sheets

ARTIFICIAL INTERCHANGEABLE HYBRID LURE WITH PERFORATIONS

BACKGROUND OF THE INVENTION

1. Field of the Invention

The present invention relates generally to fishing lures and, specifically, to a single artificial fishing lure that can function as two completely different appearing lures that can be fished from the front or back and is shaped to imitate a baitfish or a squid. The baitfish/squid lure allows for an easy manual change from one to the other.

2. Description of Related Art

Sport fishing is a large and growing pastime and industry. There are several different methods of fishing, including the use of live bait and the use of artificial bait or "lures". Different lures are to be used when fishing for different types of fish. Lures in the shape of a squid are quite popular. Lures in the shape of a baitfish are quite popular. While these two fish baits are both sea-dwelling creatures, each bait attracts different types of fish and is often used as bait in different types of fishing conditions.

One drawback to using an artificial fishing lure is that when fishing conditions change, often the lure also must be changed. Since an artificial fishing lure resembles a single object or bait, the person fishing must be aware of such changed conditions so that the correct lure to maximize fishing catch is employed. Such changes often require several minutes and can create a missed opportunity to catch a fish. Further, if the particular lure is not appropriate, an entirely different lure must be used. Thus, a user is required to carry a large inventory of several different lures to accommodate several different situations.

The prior art has attempted to solve these problems in a variety of ways. For example, U.S. Pat. No. 3,389,490, issued to Peters, et al. on Jun. 25, 1968 is entitled Fishing Lures and teaches of a "solid body of springable thermoplastic material simulating the three dimensional shape of a crayfish". The Peters' patent includes claws, a tail, and hooks which allow the device to resemble a crayfish. However, the device only resembles a crayfish and does not have the ability to be transformed into another animal.

U.S. Pat. No. 4,516,352 issued to Firmin on May 14, 1985, is entitled Artificial Crawfish Lure with Dorsal and Ventral Seam and teaches an artificial crawfish lure and hook assembly. The lure has claws, a tail, and a hook such that it resembles a crawfish, which is also known as a crayfish. However, the device only resembles a crawfish and does not have the ability to be transformed into another animal.

U.S. Pat. No. 4,862,630 issued to Welch on Sep. 5, 1989, is entitled Fishing Lure and teaches an artificial fishing lure shaped and colored like a living crab. The lure has claws, 4 pairs of legs, a central body, and an internal stiffening device. The top of the lure has a green shape, which resembles that of a living crab in order to attract fish. However, the lure only resembles a crab and does not have the ability to be transformed into another animal.

The prior art, therefore, fails to provide an artificial fishing lure that with a single lure has two separate fishing functions and which can be transformed manually for use between two different animals, thus allowing for the person fishing to fish for the same or different types of fish in different conditions. Accordingly, what is needed in the fishing industry is an improved artificial fishing lure which provides a user with one lure and two options of fishing with one or another type of hybrid bait that can be easily altered manually into a different animal shaped lure.

SUMMARY OF THE INVENTION

An artificial fishing lure, which has the appearance of either a baitfish or a squid dependent upon the direction that the hook is set (front or back). A single lure can function as bait that can be manually altered between the two different lure species depending on which type of fish a user desires to seek and catch. The lure is used with a conventional fishing hook set through the lure body in either direction.

The single lure includes an elongated cylindrical body portion with a front end and a back end. The front end narrows and then expands into the shape of a baitfish tail fin. The tail fin includes perforations that if necessary allow the user to manually tear off the tail fin for use as a squid lure only. Several elongated narrow tentacles extend from the back end of the cylindrical portion. These tentacles resemble the tentacles found on squid.

The lure is molded as a single unitary piece from a thermoplastic. The lure is used in two different fishing directions, front or back hook engagement. If the hook is attached to the front end of the lure body after the paddle tail is removed, the lure is pulled through the water, the lure resembles a squid because the tentacles are extended rearwardly away from the cylindrical body. If the hook is attached to the back end of the lure body when the lure is pulled through the water, the lure resembles a baitfish because the wider end is pulled first and the tentacles are dragged over the cylindrical body resembling a baitfish moving through the water. The lure body includes a paddle tail formed on the front end of the lure that allows the lure to swim and create action when the hook is attached to the back end. The paddle tail is affected by the water and creates a swimming motion.

Conversion of the lure from the baitfish shape to the squid shape can be immediate while fishing if fishing conditions merit such a change. There is no need to search for another lure or bait or stock separate different lures.

One of the purposes of any artificial fishing lure is to create a realistic affect that would provoke fish to believe that the lure is a real creature that could be eaten by the fish. One of the benefits of the present lure by having a hybrid squid-like and baitfish-like body is that the simulated baitfish body and tail in conjunction with the squid tentacles provide a motion for the lure as the lure is pulled through the water or as the lure sits in the water during the active pursuit of catching a fish. It is believed that the distribution and shape of this hybrid lure provides for hydraulic fluctuation during wave motion or motion of the lure through the water during fishing to help the lure dive or slow fall as a squid.

The lure is constructed by molding a single piece body of a flexible synthetic material. An example of such a material is plastic, rubber or synthetic rubbers.

It is an object of this invention to provide a single artificial fishing lure that includes a hybrid-shaped combination of two different sea life creatures which greatly enhance the ability to catch certain types of fish.

It is another object of this invention to provide a hybrid fishing lure that includes the shape of at least two different sea life creatures for bait that can be manually altered by altering the position in which the lure is operated in use by setting the hook in front or in back and by removing the paddle tail.

It is yet another object of this invention to provide an artificial fishing lure which using a single lure can provide for a variety of fishing options under different fishing conditions without the need of stocking several different types of lures.

In accordance with these and other objects which will become apparent hereinafter, the instant invention will now be described with particular reference to the accompanying drawings.

DETAILED DESCRIPTION

Figure 1:
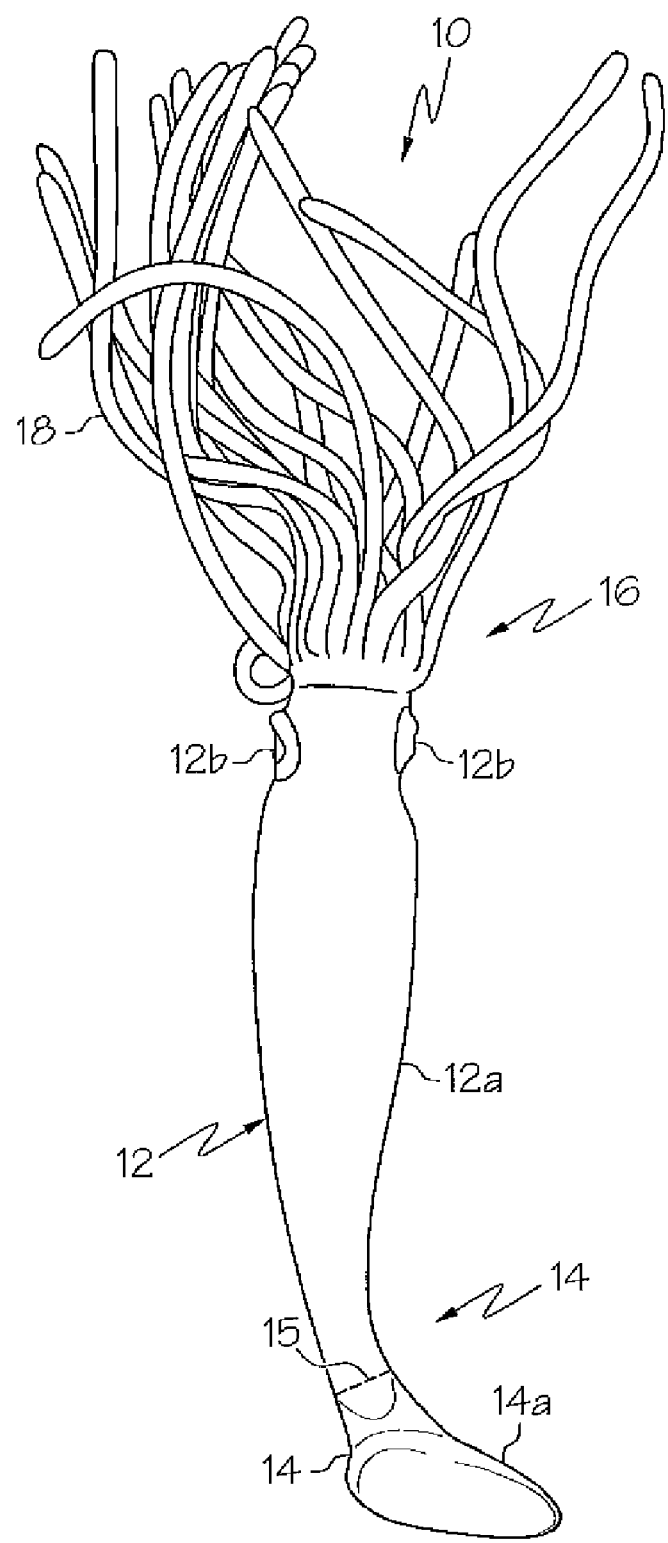
FIG. 1 shows a top plan view of the hybrid lure without a hook with the tentacles extended away from the cylindrical portion to resemble a squid.

Referring to FIG. 1, a fishing lure 10 illustrates the present invention. The fishing lure 10 employs a contoured cylindrical body member 12 with a front end 14 and a back end 16. The front end 14 narrows before spreading out into a shape resembling a fish tailfin 14a.

As shown, the tailfin 14a is attached through perforation 15. Thus, when desired, the user may tear off the tailfin 14a. The back end 16 attaches to several elongated and narrow tentacles 18 which resemble that of a squid including simulated squid eyes 12b. The contoured cylindrical body member 12 and tentacles 18 are composed of a flexibly resilient material, such as rubber, synthetic rubber, plastic or thermo-plastic.

Figure 2:
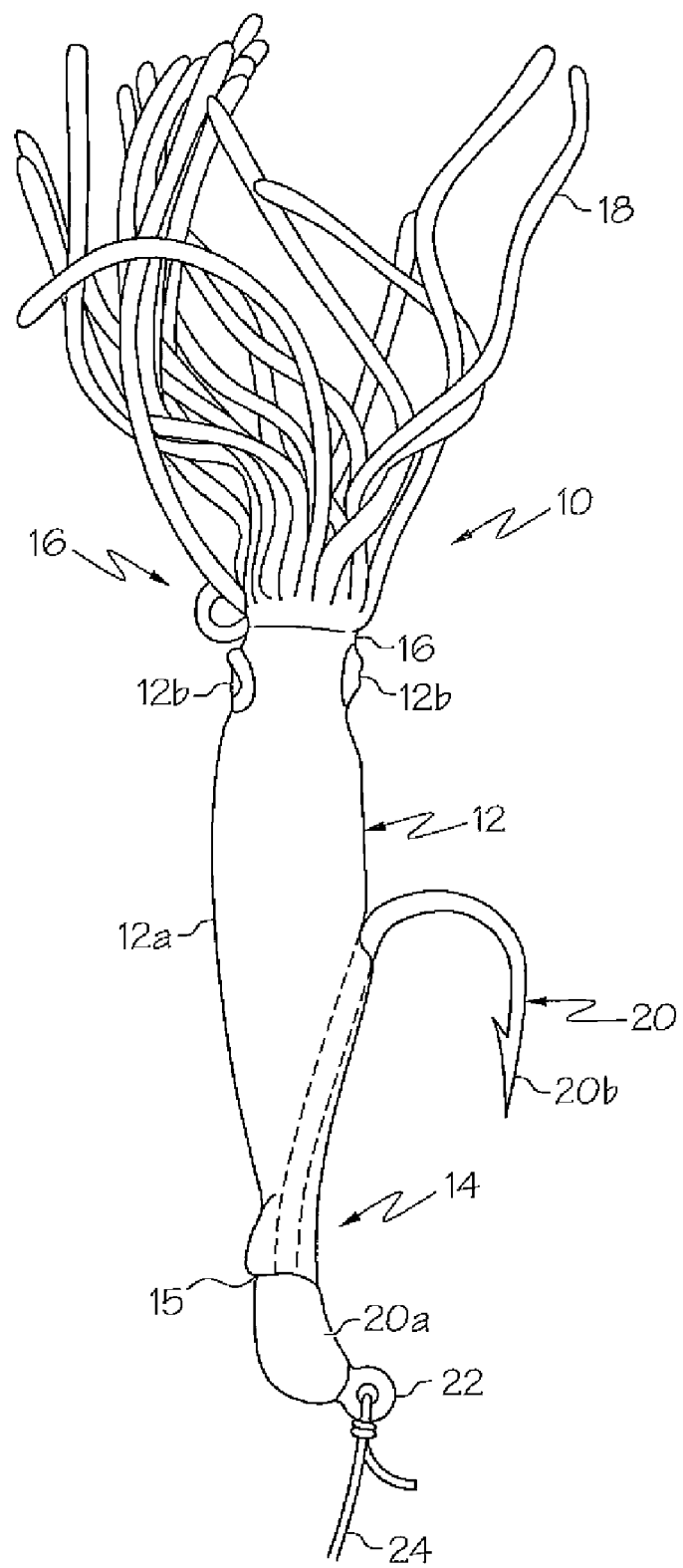
FIG. 2 shows a top plan view of the hybrid lure with the tentacles extended away from the cylindrical portion to resemble a squid with a hook inserted through the front end of the lure, after manual removal of the baitfish fin.

With reference to FIG. 2, the lure 10 is shown with the pointed end 20b of a hook 20 extended through the middle area 12a of the contoured cylindrical body member 12, with the hook end 20a and eyelet 22 exiting the front end 14 of the contoured cylindrical body member 12. In this configuration, a user connects fishing line 24 to the eyelet 22 of the fishing hook 20 and pulls the lure 10 through the water such that the water causes the tentacles 18 to extend away from the back end 16 of the contoured cylindrical body member 12. In this configuration, the lure 10 resembles a squid. In FIG. 2, the paddle tail 14a has been manually removed by using the perforations 15 to tear off the tail 14a from end 14.

Figure 3:
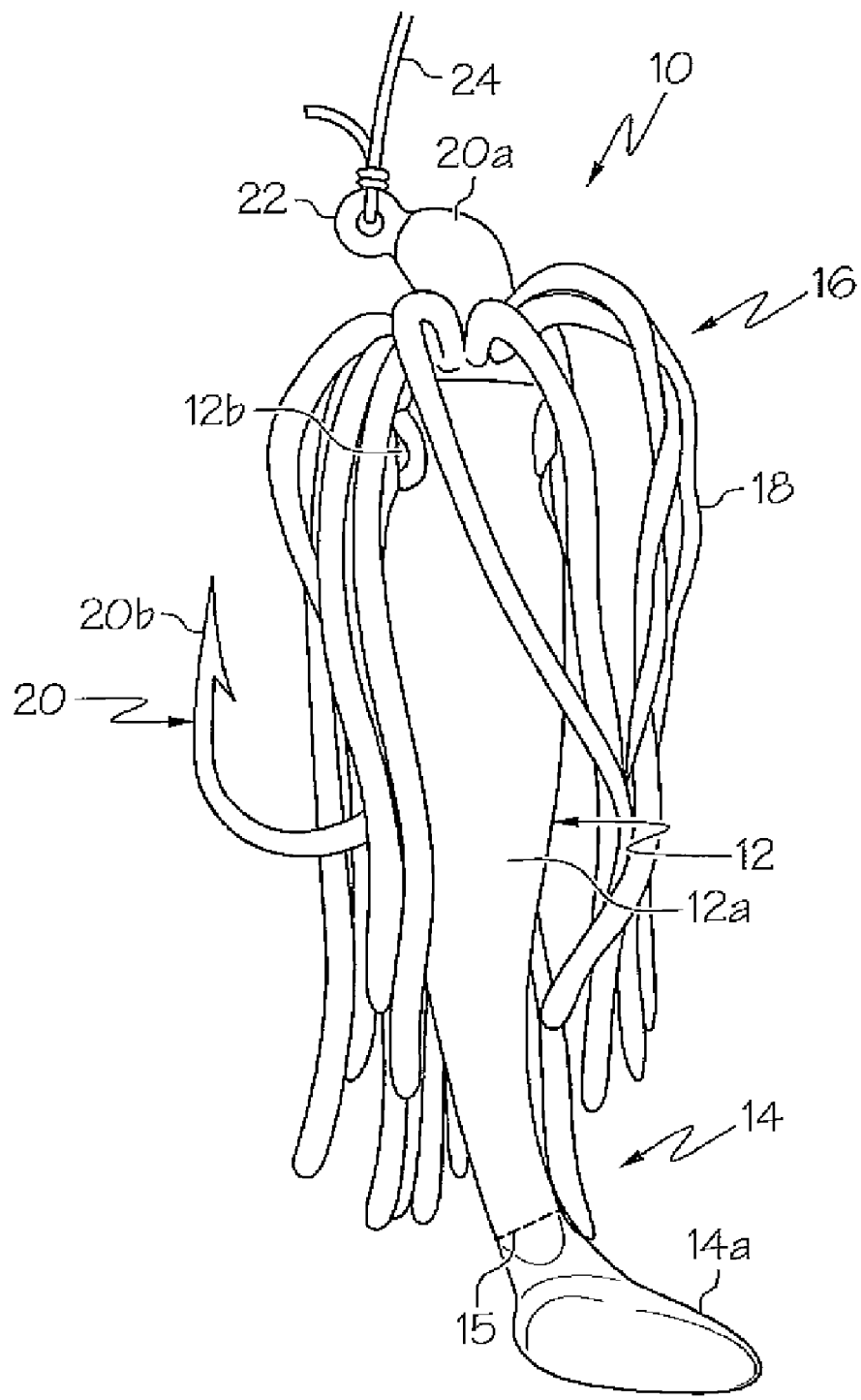
FIG. 3 shows a top plan view of the hybrid lure in use with a hook inserted through the back end of the lure and with the tentacles pushed back along the cylindrical portion to resemble a baitfish.

With reference to FIG. 3, the lure is shown with the pointed end 20b of a hook 20 through the middle 12a of the contoured cylindrical body member 12 and the eyelet 22 of the hook 20 exiting the back end 16 of the contoured cylindrical body member 12. In this configuration, a user connects fishing line 24 to the eyelet 22 of the fishing hook 20 and pulls the lure 10 through the water such that the water causes the tentacles 18 to extend along the contoured cylindrical body member 12 toward the front end 14. In this configuration, the lure 10 resembles a baitfish. The shape of paddle tail 14a on the front end 14 is affected by the force of the water and is caused to dance back and forth like the tailfin of a fish.

As a squid lure as shown in FIG. 1, the paddle tail 14a causes the lure to dive deep when pulled. If a shallow ascent is desired, the paddle tail 14a should be manually removed from end 14 as shown in FIG. 2.

Such easy transformation between different configurations allows a user to quickly change the lure 10 without spending much time or effort. The person fishing need only stock a single lure for different conditions.

Referring to the drawings, it can be seen that the contoured cylindrical body member 12 in conjunction with the tentacles 18 provides hydraulic surfaces that can add in water stability to the lure as the lure is being moved through the water on a line while, at the same time, providing a disguise for a hook that is engrossed inside the lure 10 hiding the bulk of the hook from the fish.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A hybrid fishing lure comprising:
   a contoured cylindrical body having a front end, a back end, and a mid portion in between said front end and said back end;
   said contoured cylindrical body having a baitfish tail fin shape portion on said front end;
   said contoured cylindrical body front end sized and shaped for receiving and mounting a hook and hook eyelet;
   a plurality of flexible tentacles attached to and extending from said back end of said contoured cylindrical body, said back end configured in size and shape to receive and mount a fish hook and eyelet;
   a pair of simulated squid eyes mounted on said contoured cylindrical body adjacent said flexible tentacles;
   said cylindrical body being capable of engaging with a hook suitable for fishing in a baitfish lure configuration and a squid lure configuration;
   wherein said cylindrical body includes a plurality of perforations in between the cylindrical body and the baitfish tail fin portion, where said perforations allow manual separation of said baitfish tail fin portion from said cylindrical body; and
   wherein said baitfish lure configuration, said cylindrical body is oriented such that the fishing lure imitates the tail feature of a baitfish lure and in the squid lure configuration, said cylindrical body is oriented such that the fishing lure imitates the tentacle and eye features of a squid lure.

2. The fishing lure as in claim 1, wherein the cylindrical body is constructed from a flexibly resilient material.

3. The fishing lure described in claim 1, including a fishing hook engaging said cylindrical body, said fish hook comprising a hook portion and an end portion, wherein once said baitfish tail fin portion has been removed from said cylindrical body, and where when said fish hook extends into the front end and through the cylindrical body such that said hook portion protrudes out of the mid portion and said end portion protrudes out of the front end, the squid lure configuration is actuated and when the fishing lure is pulled through the water with the tentacles pushed away from the cylindrical body, the fishing lure resembles a squid.

4. The fishing lure as in claim 1, including a fishing hook engaging said cylindrical body, said fish hook comprising a hook portion and an end portion, where when said fish hook extends into the back end of and through the cylindrical body such that said hook portion protrudes out of the mid portion and said end portion protrudes out of the back end, the baitfish lure configuration is actuated and when the fishing lure is pulled through the water with the tentacles pulled toward the front end, the fishing lure resembles a baitfish.

5. The fishing lure described in claim 4, wherein when the fishing lure is pulled through the water by the back end, the tail shape on the front end moves and simulates a swimming fish.

6. An artificial hybrid fishing lure attachable to a fish hook comprising:
- a cylindrical body made of a flexibly resilient material conformed in three dimensions having a front end shaped to imitate baitfish tail and a flat back end;
- a plurality of elongated flexible tentacles and simulated squid eyes attached to, and extending from, the back end of the contoured cylindrical body;
- said front end is attached to said cylindrical body by a plurality of perforations allowing manual separation of said front end from said cylindrical body; and
- said front end and said back end both sized and shaped to receive a fishing hook therethrough such that the fishing lure can be fished to two separate directions depending on which end a hook suitable for fishing is engaged, where a direction fished causes the fishing lure to have features of a baitfish lure appear and move like a baitfish and the other direction fished causes the fishing lure to have features of a squid lure and appear and move like a squid.

7. A fishing lure as in claim 6, including:
- a hook, said hook being suitable for fishing, where said hook is mounted through the cylindrical body from said back end such that when the fishing lure is pulled through the water, the front end moves and simulates the moving tail of a swimming fish.

8. A hybrid fishing lure as in claim 6, including a hook, said hook being suitable for fishing, where when said front end is manually removed and hook is mounted through the cylindrical body such that when the fishing lure is pulled through the water, the tentacles move and simulates the moving tentacles of a swimming squid.

9. A hybrid fishing lure comprising:
- a cylindrical body having a front end, a back end, and a mid portion in between said front end and said back end, wherein the cylindrical body is constructed from a flexibly resilient material;
- a fishing hook, said fishing hook including a hook portion and an end portion;
- said cylindrical body having a baitfish tail fin shape portion on said front end, wherein said cylindrical body includes a plurality of perforations in between the mid portion and the baitfish tail fin shaped portion, said perforations allowing for manual separation said baitfish tail fin portion from said cylindrical body, wherein the front end is capable of receiving the fishing hook if said baitfish tail fin portion has been manually removed from said cylindrical body;
- said cylindrical body having a plurality of flexible tentacles attached to and extending from said back end, where said back end is capable of receiving the fishing hook;
- where said fishing hook can be engaged with the cylindrical body to form a baitfish lure configuration or a squid lure configuration;
- where in said squid lure configuration, the fishing hook is substantially inside the cylindrical body with the hook portion protruding out of the mid portion and the end portion protruding out of the front end and the lure resembles a squid when placed in water; and
- where in said baitfish lure configuration, the fishing hook is substantially inside the cylindrical body with the hook portion protruding out of the mid portion and the end portion protruding out of the back end and the lure resembles a squid when placed in water.

* * * * *